Dec. 30, 1952 E. M. DELORAINE ET AL 2,624,025
GAS DISCHARGE TUBE WITH MOVABLE ELECTRODE
Filed Nov. 9, 1948 2 SHEETS—SHEET 1
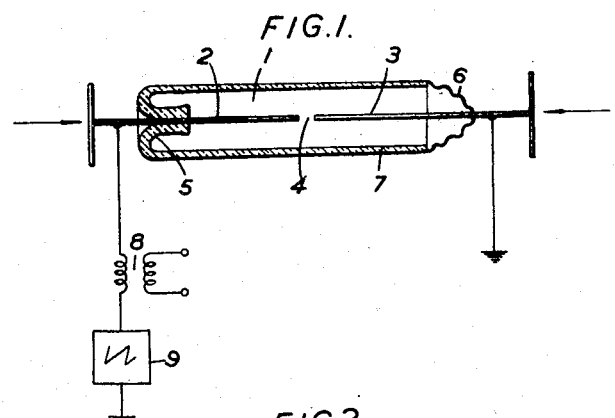
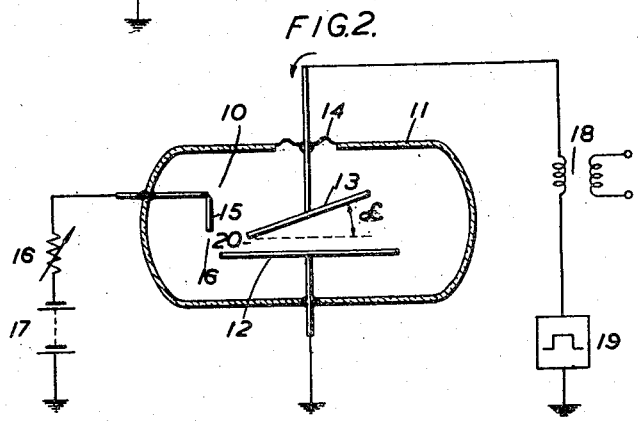
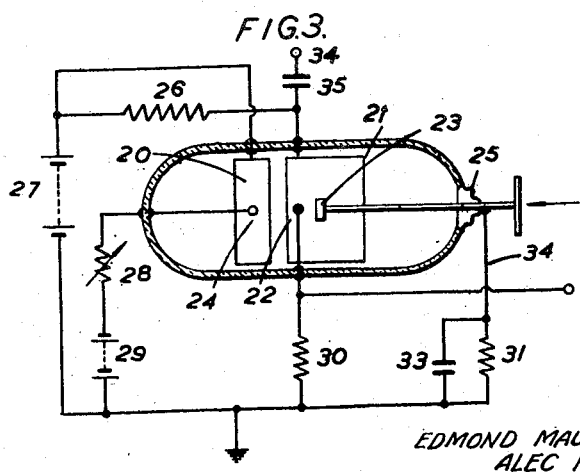
INVENTORS
EDMOND MAURICE DELORAINE
ALEC HARLEY REEVES
BY
ATTORNEY

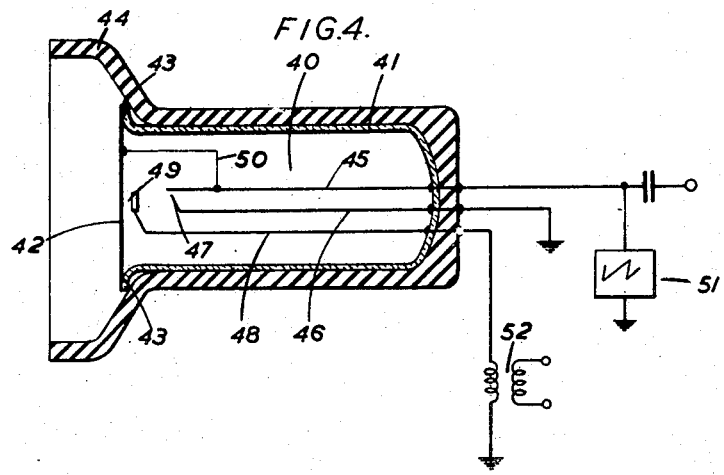
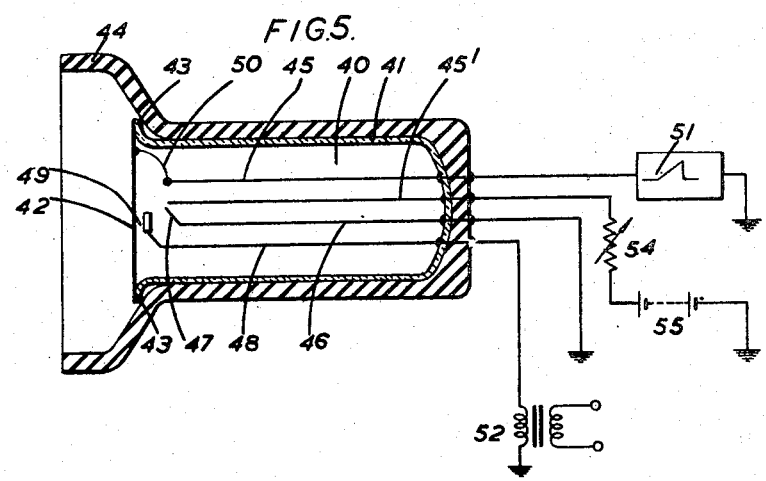

Patented Dec. 30, 1952

2,624,025

UNITED STATES PATENT OFFICE 2,624,025

GAS DISCHARGE TUBE WITH MOVABLE ELECTRODE

Edmond Maurice Deloraine and Alec Harley Reeves, London, England, assignors to International Standard Electric Corporation, New York, N. Y., a corporation of Delaware Application November 9, 1948, Serial No. 59,126
In Great Britain November 11, 1947

16 Claims. (Cl. 315—76)

1

The present invention relates to gas discharge devices and is particularly concerned with arrangements whereby external mechanical forces may be applied to electrodes of said devices in order to modify the normal operation thereof.

Heretofore electro-mechanical transducers have in large measure depended for their operation upon the use of either direct current or current of sinusoidal wave form. Of later years, however, the use of pulse techniques has come to the fore. Among some of the other advantages inherent in pulse systems is the fact that they are specially suitable for use with cold cathode electric discharge tubes as opposed to the more familiar thermionic amplifying valves usually used for amplifiers and the like.

It is an object of the present invention to provide electrical discharge devices which are adapted to function as electro-mechanical transducers utilising pulse techniques.

Devices according to the present invention utilise mechanical forces to alter the characteristics of discharge gaps with respect to striking potentials or ionisation coupling and in accordance with its most general aspect the present invention provides a gas filled electric discharge device comprising a discharge gap the electrodes of which are movable with respect to one another in response to external mechanical forces. The said device is preferably, though not necessarily of the cold cathode type.

According to a further aspect to the present invention there is provided a gas filled electric discharge device comprising means for modulating pulse signals applied thereto in accordance with external forces applied to an electrode of said device, said means comprising the variation of the position of said electrode with respect to another electrode.

Again, in another aspect, the invention provides a gas filled electric discharge device comprising an envelope, an electrode rigidly attached thereto, a flexible portion of said envelope and a second electrode secured to said flexible portion, said electrodes being insulated from one another and forming together a discharge gap.

Embodiments of the invention will be described with reference to the accompanying drawings in which:

Fig. 1 is a diagrammatic representation in section of an electric discharge device according to the present invention;

Fig. 2 shows an electric discharge device according to a further aspect of the present invention;

Fig. 3 shows an electric discharge device according to yet another aspect of the invention;

Fig. 4 shows an electric discharge device used as a microphone.

Fig. 5 shows a modification of the apparatus of Fig. 4.

In Fig. 1, there is shown a device having an envelope 1 containing an ionisable gas and a pair of electrodes 2 and 3 projecting through the ends of the envelope and forming a discharge gap 4, electrode 2 is sealed through a glass press 5, in normal manner, while electrode 3 is brought out of the device through a metallic bellows 6 which may be of any of the familiar types such as are used in connection with the adjustment of cavity resonators and may be sealed to the envelope 1 by any of the well known methods. Electrode 3 is shown connected to ground while electrode 2 is taken through a primary of pulse transformer 8 to a saw tooth wave generator 9 one side of which is connected to ground. The secondary 8a of pulse transformer 8 has two output terminals, 8b. It will be evident that because of the flexible bellows 6 compressional forces such as indicated by the arrows, or extensive forces applied to the electrodes 2 and 3, will vary the length of gap 4 and hence will vary its striking potential. Assuming compressional forces, the front of a saw tooth voltage wave applied across the gap will reach a striking voltage for the tube at an earlier time than normal consequently the pulses passed out from output terminals 8b of the secondary of transformer 8 will be of greater width than normal. Similarly, if the applied forces extended the gap, the pulses would be of smaller width. Furthermore if transformer 8 passes virtually the differential of the discharge current wave form, the change in pulse width will be directly proportional to the change of gap length and therefore proportional to the applied pulses. A device similar to that shown in Fig. 1 could be used for measuring displacements, for example it could form part of a strain gauge or the like.

In Fig. 2 the general principle is applied to a discharge device of rather different type and similar to those described in the copending U. S. application No. 15,582, filed March 18, 1948, by A. H. Reeves. Device 10 comprises in a gas filled envelope 11 an anode 12, which may be in the form of a flat plate or rod rigidly secured to envelope 11 by means not shown, and a main cathode 13 which has a smooth surface inclined as indicated at an angle $a$ to the surface of anode 12. The support for cathode 13 is taken up through the envelope of the device via a flexible membrane 14 which may allow sideways movement as indicated by the arrow so as to alter the angle a. 15 denotes an auxiliary cathode forming a priming gap with the anode plate 12, in the manner described in the copending U. S. application 19,084, filed April 5, 1948, by A. H. Reeves. Anode 12 is connected to ground as shown; auxiliary cathode 15 is connected to ground through variable resistance 16 and battery 17, while cathode 13 is connected through the primary of pulse transformer 18 with its secondary winding 18a having output terminal 18b to a square wave pulse generator 19, one side of which is grounded. When a voltage sufficient to start a discharge is applied between electrodes 12 and 13 the discharge will first strike at the shortest gap 20. The cathode glow will then spread more or less rapidly along the surface of electrode 13, the rate of spread being dependent upon:

(a) General ionisation level of the tube, which may be controlled by the current through the auxiliary discharge gap 15—16.

(b) Roughness of the surface of electrode 12.

(c) Magnitude of the applied voltage.

(d) Value of the angle a.

If the voltage be removed the cathode glow collapses along electrode 13 and will be finally extinguished at gap 20, if no maintaining voltage be applied to the tube. In general the rate of collapse will be slower than the rate of spread and will be dependent upon:

(a) General ionisation level of the tube.

(b) Roughness of the surface of electrode 12.

(c) Value of angle a.

(d) The level to which the applied voltage be reduced, which would normally be maintained at a value just below the maintaining voltage of the tube. Variation of this voltage level exercises a major influence of the rate of collapse of the cathode glow.

If a voltage square wave be applied to the electrodes 12 and 13 it should be of sufficient amplitude to initiate a discharge and should then return to a level just below the maintaining voltage at the end of the discharging period. It will be appreciated that such a square wave will tend to produce at the output, a triangular waveform, approaching saw tooth, the slope of whose front edge is greater than that of the trailing edge. The pulses obtained from transformer terminals 18 will approximate to a square waveform which will, in general, be of much greater duration than the applied square wave.

If angle a subtended by electrode 13 be increased by means of a mechanical force applied in the direction shown by the arrow, the discharge current wave form will become steeper both on rise and fall so that the output pulses from terminals 18 will vary in width in proportion to the applied force.

It is evident that other voltage waveforms could be applied to the tube and that various modifications of the device of Fig. 2 could be made; for example, the anode 12 could be the movable member but this would require a separate anode for the priming gap 16 in order to keep the priming current constant.

In Fig. 3 there is shown a device similar to that described in the aforementioned copending U. S. application No. 19,084 as a generator of time-modulated or width-modulated pulses. The device comprises an envelope 11a anodes 20 and 21 in the form of two flat plates together with a cathode rod 22 normal to the surface of 21 and a further cathode in the form of plate 23 substantially parallel to the anode plate 22. A priming cathode 24 is also included, mounted on the opposite side of cathode 22 and forming a priming gap with anode 20. Electrodes 21, 22, and 24 are rigidly connected to the tube envelope, while electrode 23 is connected through a flexible membrane or bellows 25 connected to envelope 11a, so that the separation between cathodes 22 and 23 can be varied by applied forces as shown by the arrow.

Anode plate 21 is connected through resistance 26 to the positive pole of battery 27, the negative pole of which is grounded. Anode plate 20 is connected directly to battery 27. Auxiliary cathode 24 is connected through variable resistance 28 to the negative pole of battery 29 the positive pole of which is grounded. Cathode rod 22 is connected to ground through resistance 30 and cathode plate 23 is connected to ground through resistance 31 shunted by condenser 33. Anode 21 is connected to input pulse terminal 34 through blocking condenser 35.

The voltage of battery 27 is adjusted so that in the absence of pulses applied to 34 no discharge may take place at either 22 or 23. Once 22 has been fired, however, the voltage of battery 27 should be sufficient to maintain a discharge at the associated gap the value of resistance 26 is arranged that only sufficient current is passed to maintain a discharge through cathode 22.

The striking potential of cathode 22 and plate 23 should be arranged that 22 may fire on application of incoming pulses at terminal 34, but 23 may not fire until the ionisation level due to the priming discharge of 24 and the higher level of ionisation from the discharge of 22 has reduced the striking voltage of the associated gap with 23. After a pulse at 34 has caused a discharge to take place at 22 then the cathode plate 23 will fire on the next pulse or alternatively cathode 23 may fire automatically before the arrival of the next pulse, depending on the inter-pulse interval, the cathode spacing 22—23 and the general level of ionisation in the tube. In what follows we shall assume that cathode 23 fires automatically a certain time after the discharge at 22 has been initiated. When 23 fires, a much larger current is passed through this electrode than through 22 and the current through 26 is not sufficient to maintain discharges across the gaps defined respectively with both cathodes. The discharge across the gap defined by anode 21 and cathode 22 is thus extinguished and the large current flowing across the discharge in the gap defined by anode 21 and electrode 23 through 23 charges up condenser 33 to a voltage greater than the difference between the battery voltage and the maintaining voltage for the tube. Consequently the discharges across the gaps defined respectively between anode 21 and cathode 22 and anode 21 and cathode 23 will be extinguished. A pulse is thus developed across resistance 30 whose front edge is substantially coincident with the applied pulse and whose back edge is coincident with the firing of cathode 23. The time at which cathode 23 fires is dependent upon the general level of ionisation in the tube and the inter-cathode distance 22—23. When external forces are applied, as shown by the arrow, the gap distance between 22 and 23 is varied and hence the time at which 23 fires after 22 is also changed. Hence the output pulses from cathode 22 is width modulated in accordance with the applied forces may be obtained from output terminal 36.

In Fig. 4 a device according to the present invention is used to provide a microphone in which the motion of the diaphragm instead of producing a sinusoidal current in the known manner, is caused to modulate pulses applied to electrodes of the device. In the form shown in Fig. 4 the microphone comprises a gas tube 40 having an envelope 41, which may be of glass forming a gas tube envelope in the normal manner, but closed at one end by a flexible diaphragm 42 sealed to flanges 43. The tube may be contained in a moulded case 44 to provide a suitable mouthpiece and protective covering. Tube 40 contains suitable gases, such as 92% neon, 7% hydrogen and 1% argon at a total pressure of 100 to 200 mm. of mercury. In its simplest form, the electrode system comprises an anode wire 45 and a cathode wire 46, both of which may be coated with alumina or some other insulated material to prevent discharge from 46 except at the end 47. A further cathode wire 48 is provided, forming a gap 49 at its end with diaphragm 42. The normal length of gap 49 and that between 45 and 47 may be of the order of ½ to 1 mm., but the latter gap should be slightly shorter; furthermore, gap 49 should be shorter than the gap between the end of 48 and anode wire 45. Anode wire 45 and the diaphragm 42 are electrically connected as indicated by the wire 50.

In one method of operation a pulse generator 51 is connected between anode wire 45 and ground, cathode wire 46 being connected direct to ground, while 48 is taken to ground through the primary of the pulse transformer 52.

The action of the device is as follows: A first pulse from generator 51 fires the gap defined between 47 and 45. The ionisation from this discharge reduces the striking potential of gap 49 so that this gap fires on the second pulse and passes a current surge through the primary of transformer 52. The third and subsequent pulse fires both gaps. There will be an interval of time between the application of the pulse and the firing of the main gap 49 depending upon the voltage across gap 49 (i. e. amplitude of applied pulses) and the dimensions of gap 49. This delay is utilised as a means of producing delay-time modulation as explained in the copending application of C. H. Hough and I. M. Jackson, bearing Serial No. 59,082 and filed November 9, 1948. A series of output pulses is thus obtained from terminals 52b the secondary winding 52a of the pulse transformer 52 at time intervals depending upon the length of gap 49, which varies with the applied acoustic wave on diaphragm 42.

The degree of modulation of the output pulse train may be made quite large by making diaphragm 42 sufficiently flexible and also by suitable adjustment of the voltage across the gap.

It will be evident that various modifications could be made to the electrode system and also to the precise mode of operation: for example, it may be advisable to include a permanently discharging gap for controlling the general level of ionisation and stability as has been shown in the devices of Figs. 2 and 3. Furthermore, if a steady battery voltage be applied to the electrodes, the firing of gap 49 may proceed automatically after the firing of gap defined by electrodes 47 and 45, arrangement being made to extinguish the discharge subsequently.

A device of the form shown in Fig. 5 in which like elements are indicated by the same reference numerals as in Fig. 4, could also be employed. An extra anode 45' is provided to co-operate with cathode 47. The gap defined by electrodes 45'—47 is made permanently discharging by the addition of battery 53 and resistance 54. In this case it is possible to apply a saw-tooth voltage across the main gap 49 of sufficient amplitude to discharge the gap and which returns to a voltage level insufficient to maintain the discharge at the end of the sawtooth waveform. The point at which gap 49 fires is then dependent upon the gap distance 49 which is controlled by diaphragm 42. In this case the degree of modulation possible will be dependent on the flexibility of diaphragm 42 and the rate of rise of the front edge of the sawtooth waveform delivered by generator 51.

A gas tube microphone such as described above, would be of great use in a pulse communication system and such a microphone tube could be the transmitter in a handset for a multichannel operated telephone system. Such a gas tube could be made also to perform numerous other functions besides the speech modulation of output pulses, such as dialling, ringing and so forth; instead of being a single point cathode 46, 47 is made the last point on a cathode array which is fixed sequentially by an input train of channel pulses.

What is claimed is:

1. Apparatus for producing pulse signals of variable width comprising a gaseous discharge device having an envelope containing an ionizable gas, a first electrode fixedly mounted within said envelope, a second electrode defining a discharge gap with said first electrode, a source of waves coupled across said electrodes, means including part of said envelope for mounting said second electrode free for vibratory movement with respect to said first electrode, and means responsive to mechanical vibrations for vibrating said second electrode with respect to said first electrode, thereby to produce output pulses of a width directly proportional to the length of the gap defined by said electrodes.

2. Apparatus for producing pulse signals of variable width comprising a gaseous discharge device having an envelope containing an ionizable gas, a first electrode fixedly mounted within said envelope, a second electrode adjustably spaced from said first electrode defining a discharge gap therebetween, a source of waves coupled across said electrodes, means including a flexible part of said envelope for mounting said second electrode free for vibratory movement with respect to said first electrode and means responsive to mechanical vibrations for vibrating said second electrode with respect to said first electrode, thereby to vary the firing characteristics of the discharge gap to produce output pulses of a width directly proportional to the length of the gap defined by said electrodes.

3. Apparatus for producing pulse signals of variable width comprising a gaseous discharge device having an envelope containing an ionizable gas, an anode fixedly mounted within said envelope, a cold cathode defining a discharge gap with said anode, a source of waves coupled across said anode and said cathode, means including part of said envelope for mounting said cathode free for vibratory movement with respect to said anode, and means responsive to mechanical vibrations for vibrating said cathode with respect to said anode, thereby varying the dimensions of the gap to produce output pulses of a width directly proportional to the length of the gap defined by said anode and said cathode.

4. Apparatus for producing pulse signals of variable width comprising a gaseous discharge device having an envelope having a flexible portion responsive to forces external of said envelope, a first electrode provided with a given active surface and secured to another portion of said envelope, a second electrode secured to said flexible portion of said envelope and having a surface inclined with respect to said given surface at an angle controlled by the instantaneous position of said flexible portion, a source of waves coupled across said electrodes, and means for obtaining output pulses of a width directly proportional to the length of the gap defined by said electrodes.

5. Apparatus for producing pulse signals of variable width comprising a gaseous discharge device having an envelope containing an ionizable gas, a first electrode fixedly mounted within said envelope, a second electrode defining a discharge gap with said first electrode, an auxiliary priming electrode adjacent one of said electrodes to control the ionization level of the discharge gap defined by said first electrode and said second electrode, means coupled between said auxiliary electrode and one of said other electrodes for maintaining a priming discharge gap between said auxiliary electrode and one of said other electrodes, a source of waves coupled across said first electrode and said second electrode, means including part of said envelope for mounting said second electrode free for vibratory movement with respect to said first electrode, and means responsive to mechanical vibrations for vibrating said second electrode with respect to said first electrode, thereby to produce output pulses of a width directly proportional to the length of the gap defined by said first electrode and said second electrode.

6. A device according to claim 4 wherein said first electrode constitutes an anode and said second electrode a cathode.

7. A device according to claim 4 wherein said flexible portion constitutes a diaphragm responsive to acoustic waves.

8. A device according to claim 4 wherein said surfaces are planar.

9. Apparatus for producing pulse signals of variable width comprising a gaseous discharge device having an envelope containing an ionizable gas, a first electrode electrode having a uniform surface, a second electrode mounted in fixed relative position with respect to said uniform surface and having a given discharge surface area, a third electrode having a discharge surface area larger than said given area and defining a discharge gap with said first electrode, a source of waves coupled across said first electrode and said second and third electrodes, means including a flexible portion of said envelope for mounting said third electrode free for vibratory movement with respect to said second electrode and means responsive to mechanical vibrations for vibrating said third electrode with respect to said second electrode, thereby to produce output pulses of a width directly proportional to the length of the gap defined by said second electrode and said third electrode.

10. Apparatus for producing pulse signals of variable width comprising a gaseous discharge device having an envelope containing an ionizable gas, an anode having a uniform surface, a first cathode mounted in fixed relative position with respect to said uniform anode surface and having a given discharge surface area, a second cathode having a discharge surface area larger than said given area also defining a discharge gap with said anode, a source of waves coupled across said anode and said first cathode and said second cathode, means including part of said envelope for mounting said second cathode free for vibratory movement with respect to said first cathode, and means responsive to mechanical vibrations for vibrating said second cathode with respect to said first cathode, an auxiliary discharge gap defining means positioned closer to said first cathode than to said second cathode to insure that for the same anode cathode voltage, said first cathode will fire before said second cathode, and means to obtain output pulses of a width directly proportional to the length of the gap defined by said first cathode and said second cathode.

11. A device according to claim 9 wherein said first cathode is a rod normal to said given anode surface and wherein said second cathode is a plate uniformly spaced from said given anode surface.

12. A device according to claim 9 wherein said flexible portion constitutes a diaphragm responsive to acoustic waves.

13. Apparatus for producing pulse signals of variable width comprising a gaseous discharge device having an envelope containing an ionizable gas closed at one end by a freely vibratory flexible diaphragm means for vibrating said diaphragm in resonance with impinging intelligence bearing acoustic waves, a cathode forming with said diaphragm a first discharge gap having a given firing voltage, an auxiliary gap defining means forming a second discharge gap having a lower striking voltage than that of said first discharge gap to prime said first discharge gap, a source of waves coupled across respective of said discharge gaps, means for obtaining output pulses of a width directly proportional to the length of the gap defined by said diaphragm and said cathode.

14. A device according to claim 13 wherein said auxiliary gap defining means comprises a pair of auxiliary electrodes.

15. A device according to claim 13 wherein said auxiliary gap defining means comprises an anode electrically connected to said diaphragm and an additional cathode co-operating with said anode to form said auxiliary discharge gap.

16. A device according to claim 15 wherein there is provided permanently discharging priming means comprising an additional anode co-operating with said additional cathode.

EDMOND MAURICE DELORAINE.
ALEC HARLEY REEVES.

REFERENCES CITED

The following references are of record in the file of this patent:

UNITED STATES PATENTS

| Number | Name | Date |
|---|---|---|
| 1,548,095 | Osborne | Mar. 3, 1921 |
| 2,412,659 | Thomas | Dec. 17, 1946 |
| 2,415,962 | Okress | Feb. 18, 1947 |
| 2,456,896 | Slack et al. | Dec. 21, 1948 |
| 2,474,280 | Rothstein | June 28, 1949 |